US012546308B2

(12) United States Patent
Nowell et al.

(10) Patent No.: US 12,546,308 B2
(45) Date of Patent: Feb. 10, 2026

(54) MULTI-PIECE FLUID END

(71) Applicant: Kerr Machine Co., Sulphur, OK (US)

(72) Inventors: Mark S. Nowell, Ardmore, OK (US); Kelcy Jake Foster, Sulphur, OK (US); Micheal Cole Thomas, Ardmore, OK (US); Christopher Todd Barnett, Stratford, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 18/629,397

(22) Filed: Apr. 8, 2024

(65) Prior Publication Data

US 2024/0254979 A1 Aug. 1, 2024

Related U.S. Application Data

(63) Continuation of application No. 17/109,966, filed on Dec. 2, 2020, now abandoned, which is a continuation of application No. 16/216,709, filed on Dec. 11, 2018, now abandoned, which is a continuation-in-part of application No. 16/169,663, filed on Oct. 24, 2018,
(Continued)

(51) Int. Cl.
*F04B 53/16* (2006.01)
*F04B 53/22* (2006.01)

(52) U.S. Cl.
CPC ............ *F04B 53/164* (2013.01); *F04B 53/22* (2013.01)

(58) Field of Classification Search
CPC ...... E21B 43/129; E21B 43/2607; F04B 1/02; F04B 39/0005; F04B 39/10; F04B 23/06; F04B 53/10; F04B 53/16; F04B 53/143; F04B 53/164
See application file for complete search history.

(56) References Cited

U.S. PATENT DOCUMENTS 589,725 A 9/1897 Hodge et al.
1,316,539 A 9/1919 Ford
(Continued)

FOREIGN PATENT DOCUMENTS

DE 102010031445 A1 1/2012
SU 909276 A1 * 2/1982
WO WO-2016018337 A1 * 2/2016 ............ F04B 53/162

OTHER PUBLICATIONS

Exhibits X-AA include photos of a power end and fluid end known in the are prior to Dec. 11, 2017, 4 pages.
(Continued)

*Primary Examiner* — Nathan C Zollinger
(74) *Attorney, Agent, or Firm* — Tomlinson McKinstry, P.C.

(57) ABSTRACT

A fluid end is formed from a first body attached to a separate second body. Each body includes an external surface. When the bodies are attached, their respective external surfaces are in flush engagement. A plurality of bores are formed in the second body that are alignable with a plurality of corresponding bores formed in the first body. The fluid end may be used with seals disposed within recesses within each bore to seal against corresponding sealing surfaces. Further, retaining closures may be bolted to the fluid end bodies, such that the closures have a threadless connection to the fluid end bodies. Various combinations of such components may be utilized.

17 Claims, 15 Drawing Sheets

Related U.S. Application Data now abandoned, and a continuation-in-part of application No. 16/111,754, filed on Aug. 24, 2018, now Pat. No. 11,078,903, and a continuation-in-part of application No. 16/043,579, filed on Jul. 24, 2018, now Pat. No. 10,648,490, and a continuation-in-part of application No. 16/035,126, filed on Jul. 13, 2018, now Pat. No. 10,670,013, and a continuation-in-part of application No. 15/719,124, filed on Sep. 28, 2017, now Pat. No. 10,895,325, which is a continuation-in-part of application No. 15/280,642, filed on Sep. 29, 2016, now Pat. No. 10,288,178.

(60) Provisional application No. 62/700,079, filed on Jul. 18, 2018, provisional application No. 62/676,656, filed on May 25, 2018, provisional application No. 62/653,605, filed on Apr. 6, 2018, provisional application No. 62/646,970, filed on Mar. 23, 2018, provisional application No. 62/636,425, filed on Feb. 28, 2018, provisional application No. 62/607,872, filed on Dec. 19, 2017, provisional application No. 62/597,241, filed on Dec. 11, 2017, provisional application No. 62/581,237, filed on Nov. 3, 2017, provisional application No. 62/576,443, filed on Oct. 24, 2017, provisional application No. 62/562,588, filed on Sep. 25, 2017, provisional application No. 62/549,530, filed on Aug. 24, 2017, provisional application No. 62/537,342, filed on Jul. 26, 2017, provisional application No. 62/536,297, filed on Jul. 24, 2017, provisional application No. 62/532,574, filed on Jul. 14, 2017, provisional application No. 62/346,915, filed on Jun. 7, 2016, provisional application No. 62/318,542, filed on Apr. 5, 2016, provisional application No. 62/315,343, filed on Mar. 30, 2016, provisional application No. 62/234,483, filed on Sep. 29, 2015.

(56) References Cited

U.S. PATENT DOCUMENTS

| | | | |
|---|---|---|---|
| 1,822,682 | A | 9/1931 | Weiger |
| 1,867,279 | A | 7/1932 | Price |
| 1,995,359 | A | 3/1935 | Mohr |
| 2,331,513 | A * | 10/1943 | Stahl .................. F04B 53/164 92/147 |
| 2,713,522 | A | 7/1955 | Petch |
| 2,756,960 | A | 7/1956 | Church |
| 2,856,857 | A | 10/1958 | Saalfrank |
| 3,030,117 | A * | 4/1962 | Cooper ................ F04B 53/144 277/910 |
| 3,053,500 | A | 9/1962 | Atknison |
| 3,146,724 | A | 9/1964 | Cornelsen |
| 3,152,787 | A | 10/1964 | Timmos |
| 3,173,648 | A | 3/1965 | McGuire et al. |
| 3,179,121 | A | 4/1965 | Bredtschneider et al. |
| 3,219,311 | A | 11/1965 | Siver |
| 3,244,424 | A | 4/1966 | Cope |
| 3,257,095 | A | 6/1966 | Siver |
| 3,257,952 | A | 6/1966 | McCormick |
| 3,269,698 | A | 8/1966 | Koch |
| 3,373,695 | A * | 3/1968 | Yohpe ..................... F04B 1/00 417/454 |
| 3,427,988 | A * | 2/1969 | Schmieman ............ F04B 53/10 417/569 |
| 3,474,808 | A | 10/1969 | Elliott |
| 3,504,888 | A | 4/1970 | Bates, Jr. et al. |
| 3,589,387 | A | 6/1971 | Raymond |
| 3,679,332 | A | 7/1972 | Yohpe |
| 3,698,726 | A | 10/1972 | Schettler |
| 3,702,624 | A | 11/1972 | Fries |
| 3,831,900 | A | 8/1974 | Matousek et al. |
| 4,047,850 | A | 9/1977 | Berthelot |
| 4,077,102 | A | 3/1978 | Smith |
| 4,170,214 | A | 10/1979 | Gill et al. |
| 4,363,463 | A | 12/1982 | Moon, Jr. |
| 4,388,050 | A | 6/1983 | Schuller |
| 4,467,703 | A | 8/1984 | Redwine et al. |
| 4,470,771 | A | 9/1984 | Hall et al. |
| 4,508,133 | A * | 4/1985 | Hamid .................... F16K 17/16 137/68.22 |
| 4,520,837 | A | 6/1985 | Cole et al. |
| 4,768,933 | A | 9/1988 | Stachowiak |
| 4,771,801 | A | 9/1988 | Crump et al. |
| 4,773,833 | A | 9/1988 | Wilkinson et al. |
| 4,778,347 | A | 10/1988 | Mize |
| 4,861,241 | A | 8/1989 | Gamboa et al. |
| 4,878,815 | A * | 11/1989 | Stachowiak ........ F04B 53/1025 417/454 |
| 4,948,349 | A | 8/1990 | Koiwa |
| 4,984,970 | A | 1/1991 | Eickmann |
| 5,059,101 | A | 10/1991 | Valavaara |
| 5,073,096 | A | 12/1991 | King et al. |
| 5,145,340 | A | 9/1992 | Allard |
| 5,207,242 | A | 5/1993 | Daghe et al. |
| 5,226,445 | A | 7/1993 | Surjaatmadja |
| 5,362,215 | A | 11/1994 | King |
| 5,370,148 | A | 12/1994 | Shafer |
| 5,507,219 | A | 4/1996 | Stogner |
| 5,524,902 | A | 6/1996 | Cornette |
| 5,626,345 | A | 5/1997 | Wallace |
| D383,053 | S | 9/1997 | Schrader et al. |
| 5,685,519 | A | 11/1997 | Bircann et al. |
| 6,000,764 | A | 12/1999 | Dokas |
| 6,164,318 | A | 12/2000 | Dixon |
| 6,167,959 | B1 | 1/2001 | Bassinger et al. |
| 6,257,626 | B1 | 7/2001 | Campau et al. |
| 6,382,940 | B1 | 5/2002 | Blume |
| 6,419,459 | B1 | 7/2002 | Sibbing |
| 6,544,012 | B1 | 4/2003 | Blume |
| 6,641,112 | B2 | 11/2003 | Antoff et al. |
| 6,910,871 | B1 | 6/2005 | Blume |
| 7,140,211 | B2 | 11/2006 | Tremblay |
| 7,168,440 | B1 | 1/2007 | Blume |
| 7,186,097 | B1 | 3/2007 | Blume |
| 7,290,560 | B2 | 11/2007 | Orr et al. |
| 7,296,591 | B2 | 11/2007 | Moe et al. |
| 7,335,002 | B2 | 2/2008 | Vicars |
| 7,506,574 | B2 | 3/2009 | Jensen et al. |
| 7,513,759 | B1 | 4/2009 | Blume |
| D616,966 | S | 6/2010 | Angell |
| 7,789,133 | B2 | 9/2010 | McGuire |
| 7,828,053 | B2 | 11/2010 | McGuire et al. |
| 7,845,413 | B2 | 12/2010 | Shampine et al. |
| D631,142 | S | 1/2011 | Angell |
| 7,866,346 | B1 | 1/2011 | Walters |
| 7,891,374 | B2 | 2/2011 | Vicars |
| 7,951,226 | B2 * | 5/2011 | Stanton .................. F04B 53/164 96/108 |
| 7,963,502 | B2 | 6/2011 | Lovell et al. |
| 8,100,407 | B2 | 1/2012 | Stanton et al. |
| 8,317,498 | B2 | 11/2012 | Gambier et al. |
| 8,360,094 | B2 | 1/2013 | Steinbock et al. |
| 8,365,754 | B2 | 2/2013 | Riley et al. |
| 8,528,462 | B2 | 9/2013 | Pacht |
| 8,528,585 | B2 | 9/2013 | McGuire |
| 8,701,546 | B2 | 4/2014 | Pacht |
| 9,010,412 | B2 | 4/2015 | McGuire |
| D731,035 | S | 6/2015 | Lo Cicero |
| D737,497 | S | 8/2015 | Burgess et al. |
| 9,188,121 | B1 | 11/2015 | Dille |
| D748,228 | S | 1/2016 | Bayyouk et al. |
| 9,260,933 | B2 | 2/2016 | Artherholt et al. |
| 9,328,745 | B2 | 5/2016 | Bartlok et al. |
| 9,371,919 | B2 | 6/2016 | Forrest et al. |
| 9,416,887 | B2 | 8/2016 | Blume |
| 9,435,454 | B2 | 9/2016 | Blume |
| 9,534,473 | B2 | 1/2017 | Morris et al. |
| 9,631,739 | B2 | 4/2017 | Belshan et al. |
| D787,029 | S | 5/2017 | Bayyouk et al. |

(56) References Cited

U.S. PATENT DOCUMENTS

| | | |
|---|---|---|
| 9,732,746 B2 | 8/2017 | Chandrasekaran et al. |
| 9,822,894 B2 | 11/2017 | Bayyouk et al. |
| D806,241 S | 12/2017 | Swinney et al. |
| 9,976,544 B2 * | 5/2018 | Morreale ............... F04B 53/22 |
| 10,184,470 B2 | 1/2019 | Barnett, Jr. |
| 10,221,847 B2 | 3/2019 | Dyer |
| 10,519,950 B2 | 12/2019 | Foster |
| 10,914,171 B2 | 2/2021 | Foster |
| 2002/0166588 A1 | 11/2002 | Dean |
| 2004/0170507 A1 | 9/2004 | Vicars |
| 2004/0234404 A1 | 11/2004 | Vicars |
| 2005/0151107 A1 | 7/2005 | Shu |
| 2005/0200081 A1 | 9/2005 | Stanton et al. |
| 2006/0002806 A1 | 1/2006 | Baxter et al. |
| 2006/0027779 A1 | 2/2006 | McGuire et al. |
| 2007/0164249 A1 | 7/2007 | Willers |
| 2008/0006089 A1 | 1/2008 | Adnan et al. |
| 2008/0008605 A1 | 1/2008 | Bauer et al. |
| 2008/0093361 A1 | 4/2008 | Kennedy et al. |
| 2008/0279706 A1 | 11/2008 | Gambier et al. |
| 2009/0013864 A1 | 1/2009 | Mohn |
| 2010/0158726 A1 * | 6/2010 | Donald ................ F04B 9/045 417/437 |
| 2010/0243255 A1 | 9/2010 | Luharuka et al. |
| 2010/0300683 A1 * | 12/2010 | Looper ............... E21B 47/008 166/250.01 |
| 2011/0079302 A1 | 4/2011 | Hawes |
| 2011/0173814 A1 | 7/2011 | Patel |
| 2011/0189040 A1 | 8/2011 | Vicars |
| 2011/0206547 A1 | 8/2011 | Kim et al. |
| 2011/0236238 A1 | 9/2011 | Cordes et al. |
| 2012/0063936 A1 | 3/2012 | Baxter et al. |
| 2012/0141308 A1 | 6/2012 | Saini et al. |
| 2012/0187321 A1 | 7/2012 | Small |
| 2013/0020521 A1 | 1/2013 | Byrne |
| 2013/0112074 A1 | 5/2013 | Small |
| 2013/0202458 A1 | 8/2013 | Byrne et al. |
| 2013/0319220 A1 | 12/2013 | Luharuka et al. |
| 2013/0330181 A1 | 12/2013 | Frodl |
| 2014/0127062 A1 | 5/2014 | Buckley et al. |
| 2014/0196883 A1 | 7/2014 | Artherholt et al. |
| 2014/0348677 A1 | 11/2014 | Moeller et al. |
| 2015/0084335 A1 | 3/2015 | Farrell et al. |
| 2015/0132157 A1 | 5/2015 | Whaley et al. |
| 2015/0144826 A1 | 5/2015 | Bayyouk et al. |
| 2015/0361745 A1 | 12/2015 | Guerra |
| 2016/0123313 A1 | 5/2016 | Simmons |
| 2016/0160848 A1 | 6/2016 | Toppings et al. |
| 2016/0175918 A1 | 6/2016 | Taylor |
| 2017/0002947 A1 | 1/2017 | Bayyouk et al. |
| 2017/0089473 A1 | 3/2017 | Nowell et al. |
| 2017/0204852 A1 | 7/2017 | Barnett, Jr. |
| 2017/0211565 A1 | 7/2017 | Morreale |
| 2018/0017173 A1 | 1/2018 | Nowell et al. |
| 2018/0313456 A1 | 11/2018 | Bayyouk et al. |
| 2019/0011051 A1 | 1/2019 | Yeung |
| 2019/0128104 A1 | 5/2019 | Graham et al. |
| 2020/0182240 A1 | 6/2020 | Nowell |

OTHER PUBLICATIONS

International Search Authority "PCT International Search Report", Mar. 31, 2020, 3 pages, Korean Intellectual Property Office, Republic of Korea.

Exhibit AB includes cross-sectional views of fluid end assemblies known in the art prior to Sep. 29, 2015, 4 pages.

Exhibit AC includes side views of valve seats known in the art prior to Sep. 29, 2015, 2 pages.

Exhibit AD is a cross-sectional view of a plunger end of a fluid assembly known in the art prior to Sep. 29, 2015, 1 page.

Exhibit AE includes an engineering drawing and pictures of a mud pump known in the art prior to Sep. 29, 2015, 4 pages.

Exhibit AF is a photograph of a fluid end offered for sale in the United States more than one year prior to Dec. 10, 2018, and also includes patent drawing of a fluid end similar to that shown in the photograph. The drawing was included in U.S. Appl. No. 62/532,574, filed Jul. 14, 2017, 2 pages.

Wikipedia, Washer (hardware), 2017, first page.

* cited by examiner

MULTI-PIECE FLUID END

BACKGROUND

Fluid ends are used in oil and gas operations to deliver highly pressurized corrosive and/or abrasive fluids to piping leading to a wellbore. Fluid is pumped throughout a fluid end by a plurality of plungers disposed within bores formed in the fluid end body. An engine attached to a power end causes the plungers to reciprocate within the bores. The power end is attached to the fluid end via a plurality of stay rods. Stay rods are known in the art as elongate steel rods.

Fluid used in high-pressure hydraulic fracturing operations is typically pumped through the fluid end at a minimum of 5,000 to 8,000 psi; however, fluid will normally be pumped through the fluid end at pressures around 10,000-15,000 psi during such operations.

The corrosive and/or abrasive fluid pumping through a fluid end at high flow rates and pressures causes the fluid end to wear faster than a power end. Thus, a fluid end typically has a much shorter lifespan than a power end. A typical power end may service five or more different fluid ends during its lifespan. The stay rods used to attach the fluid ends to power ends may be reused with each new fluid end.

In fluid ends known in the art, such as the fluid end 300 shown in FIGS. 14 and 15, a flange is machined into a fluid end body to provide a connection point for a plurality of stay rods. A flange 302 is shown formed in a fluid end body 304 in FIGS. 14 and 15. A plurality of stay rods 306 interconnect a power end 308 and the flange 302.

DETAILED DESCRIPTION

Figure 14:
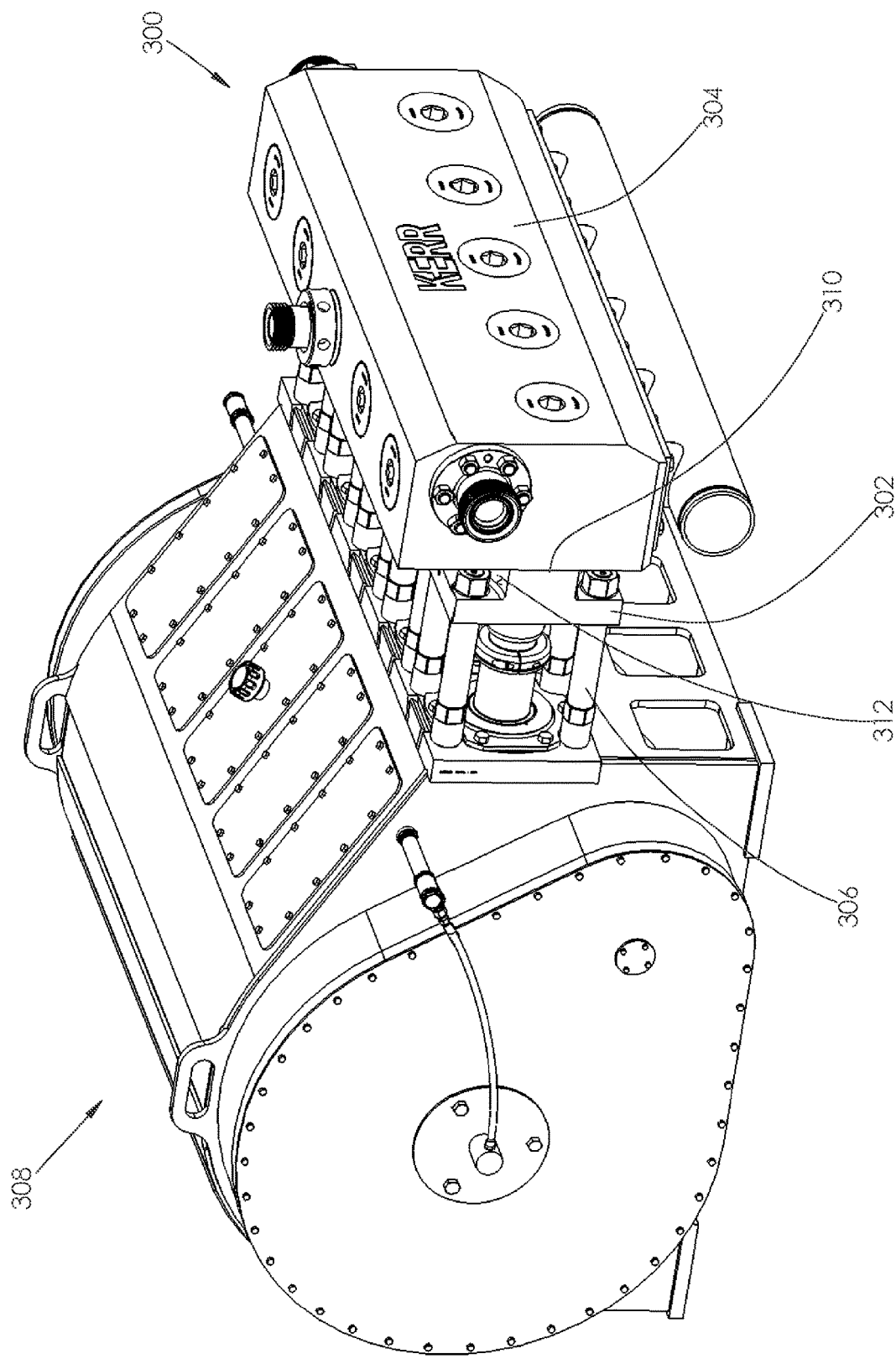
FIG. 14 is a perspective view of a fluid end known in the art attached to a power end.
Figure 15:
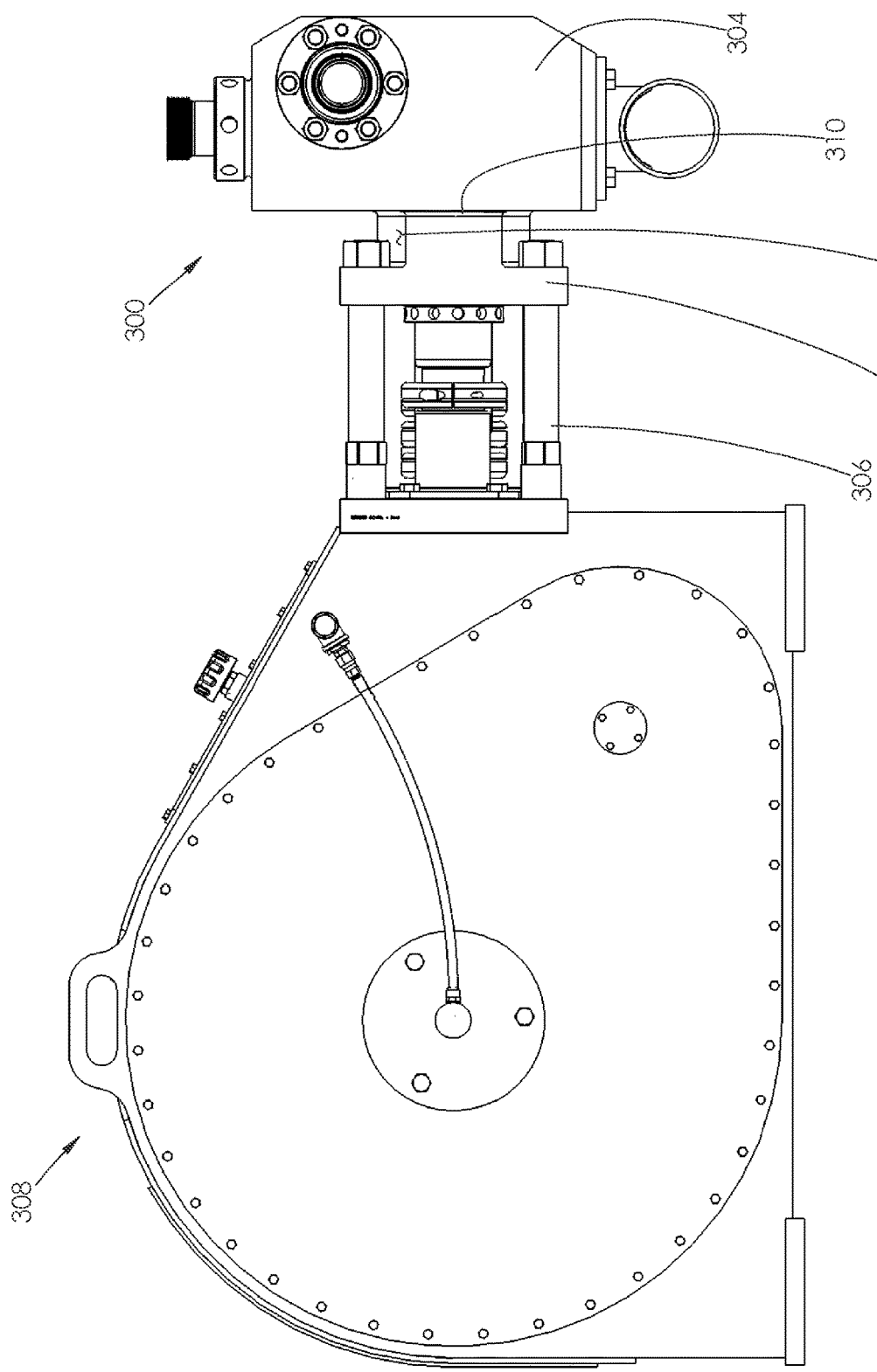
FIG. 15 is a side elevation view of the fluid end and power end shown in FIG. 14.

The inventors have recognized that current fluid end designs including those shown in FIGS. 14 and 15 are problematic for several reasons. First, for those designs having a flange, the machining required to create a flange reduces the strength of the fluid end by producing stress concentrations that reduce the effective life of the fluid end. Second, machining the flange into the fluid end also entails wastage of significant amounts of removed raw material, and requires a significant investment of time and labor, thus resulting in increased manufacturing costs.

One solution to the issues presented by a machined flange is to remove the flange and attach the stay rods directly to the fluid end body. However, this solution requires uniquely designed stay rods that must be replaced with the fluid end each time the fluid end reaches the end of its lifespan. Such an approach may thus be disadvantageous during actual operation of the device.

To address these problems, the inventors have designed a multi-body-piece fluid end, embodiments of which are shown in FIGS. 1-13. Such designs, particularly those that are flangeless, may lead to less stress being placed on the fluid end during operation, resulting in increased product life. This design also uses fewer raw materials, reducing manufacturing costs. Still further, the construction of the fluid end permits it to be attached to a power end using traditional stay rods.

In general, fluid ends with multiple body pieces are contemplated by the present disclosure. Thus, the fluid end body is not formed from a monolithic piece of material as in certain prior art designs. As will be described below, FIGS. 1-2, for example, illustrate a fluid end with two body pieces, 20 and 22; this design achieves savings in raw materials (and thus cost), and also leads to less stress on the fluid end during operation, in part because of the flangeless design. That is, neither of body pieces 20 or 22 includes a flange, such as flange 302 shown in FIGS. 14-15. As used herein, a "flange" is used according to its ordinary meaning in the art, and includes a piece of a structural member that has a wider portion as compared to another portion of the structural member, such as a rim, rib, collar, plate, ring, etc. In FIGS. 14-15, for example, the flanged member has the shape of a half I-beam, or alternately a sideways "T"-shape. As used herein, a "flangeless" fluid end body piece is one that does not include a flange.

In embodiments with two body pieces, the second body piece, upon installation, is closer to the power end than the first body piece. In such an arrangement, a front side of the second body piece may engage with a back side of the front body piece in various manners. In certain embodiments, the first and second body pieces may be in flush engagement, meaning that the entire surface of the front side of the second body piece (excluding bores and through holes since these areas have no surface) is in contact with the back side of the first body piece. The concept of flush engagement thus includes embodiments in which the front side of the second body piece and the back side of the first body piece have the same surface dimensions, as well as embodiments in which the back side of the front body piece has at least one surface dimension that is larger than a corresponding surface dimension of the front side of the second body piece. In the former scenario, the front side of the second body piece may be said to align with and abut the back side of the first body piece. In other embodiments, the front side of the second body piece might have one or more beveled edges, such that it has slightly smaller dimensions than the back side of the first body piece. Flush engagement between the front side of the second body piece and the back side of the first body piece includes embodiments in which the engaging portions of the two surfaces are planar, as well as embodiments in which the surfaces are not planar. Alternately, the front side of the second body piece may be partially engaged with the back side of the second body piece, meaning that not every portion of the front side of the second body piece contacts a portion of the back side of the first body piece. Note that partial engagement between the two body pieces may exist both when the two pieces have the same surface dimensions (for example, certain portions of one or both of the pieces may project such that only those portions contact the other piece), as well as when the second body piece has at least one surface dimension that is greater than a corresponding surface dimension of the first body piece.

The present disclosure also contemplates fluid ends with more than two body pieces. For instance, the front side of the second body piece may engage with the back side of the first body piece via one or more spacer elements. For example, washers might be used to separate the first and second body pieces at a distance. In other embodiments, the spacer element may be a thin intervening body piece configured to be situated between the first and second body pieces. The portion of the fluid end nearest the power end upon installation can also be composed of multiple individual pieces ("a plurality of second fluid end body pieces"), each of which has a front side that can engage with the back side of the first body in one of the various manners described above. Whether the portion of the fluid end nearest the power end is composed of a single piece or two or more sub-pieces, this portion being flangeless may advantageously reduce internal stress on the fluid end and extend its life.

Figure 1:
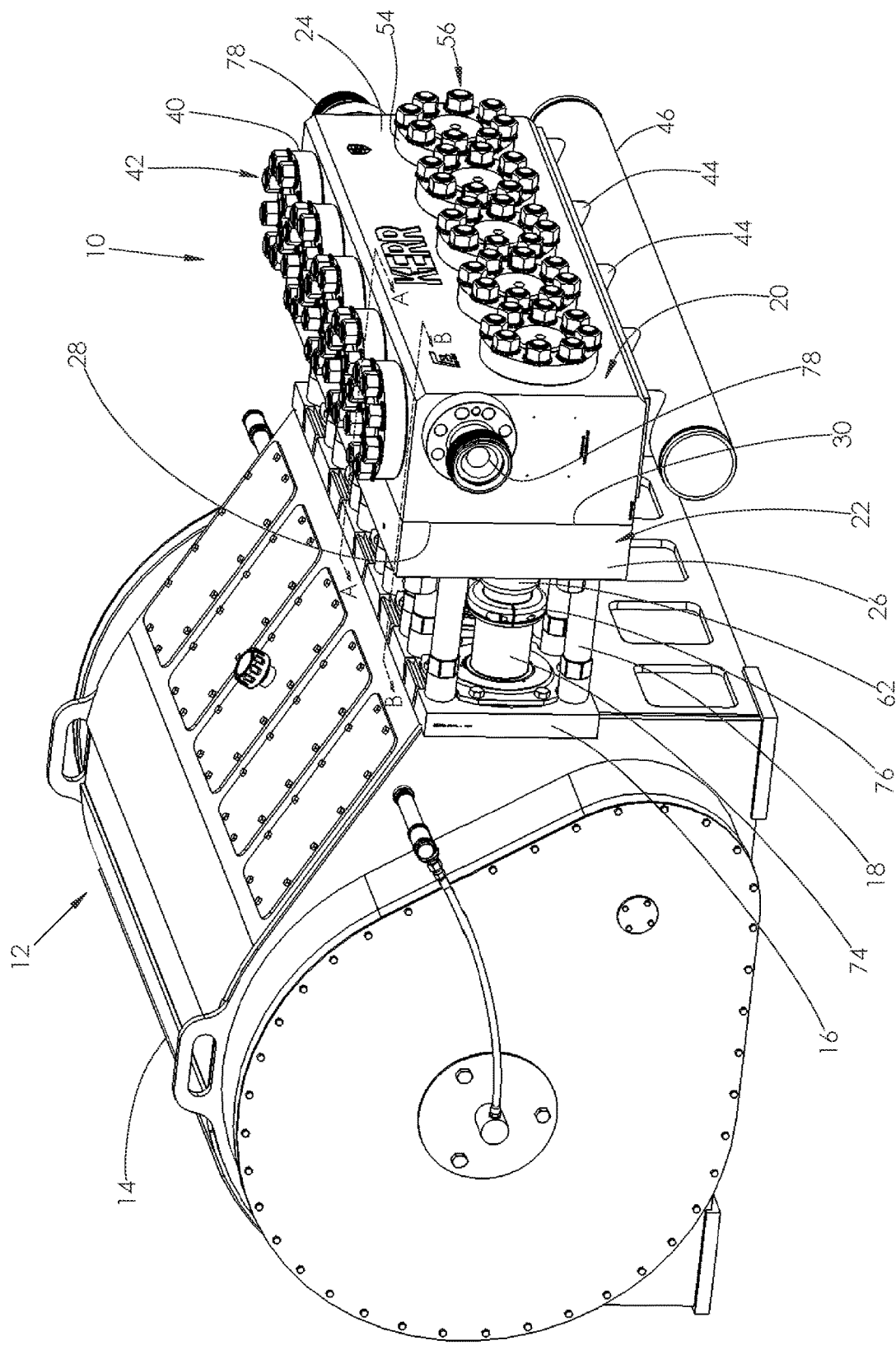
FIG. 1 is a perspective view of a fluid end attached to a power end.
Figure 2:
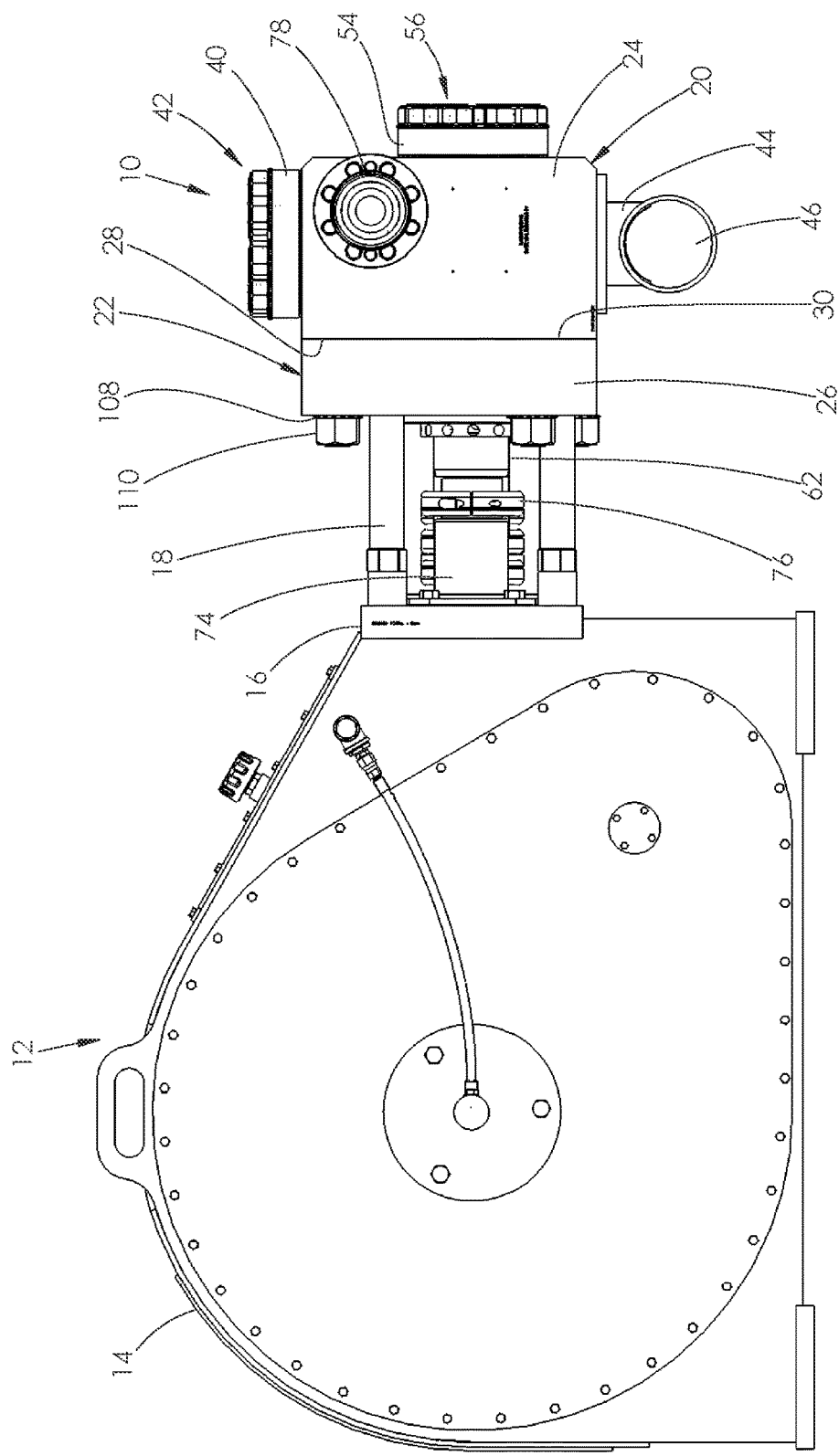
FIG. 2 is a side elevation view of the fluid end and power end shown in FIG. 1.

Turning now to the figures, FIGS. 1-2 show a fluid end 10 with two body pieces attached to a power end 12. The power end 12 comprises a housing 14 having a mounting plate 16 formed on its front end. A plurality of stay rods 18 attach to the mounting plate 16 and project from its surface. As will be discussed in more detail later herein, the fluid end 10 attaches to the projecting ends of the stay rods 18.

The fluid end 10 comprises a first body 20 releasably attached to a separate second body 22. The first and second bodies 20 and 22 both have a plurality of flat external surfaces 24, 26. Each surface 24, 26 may be rectangular in shape. The exterior surfaces 24 and 26 of each body 20 and 22 may be joined in the shape of a rectangular prism. However, the corner edges of such prism may be beveled. As will be discussed in more detail later herein, a back side 28 of the first body 20 is attached to a front side 30 of the second body 22. In some embodiments, the bodies 20 and 22 are attached such that a portion of the external surface 24 of the first body 20 is in flush engagement with a portion of the external surface 26 of the second body 22.

Figure 3:
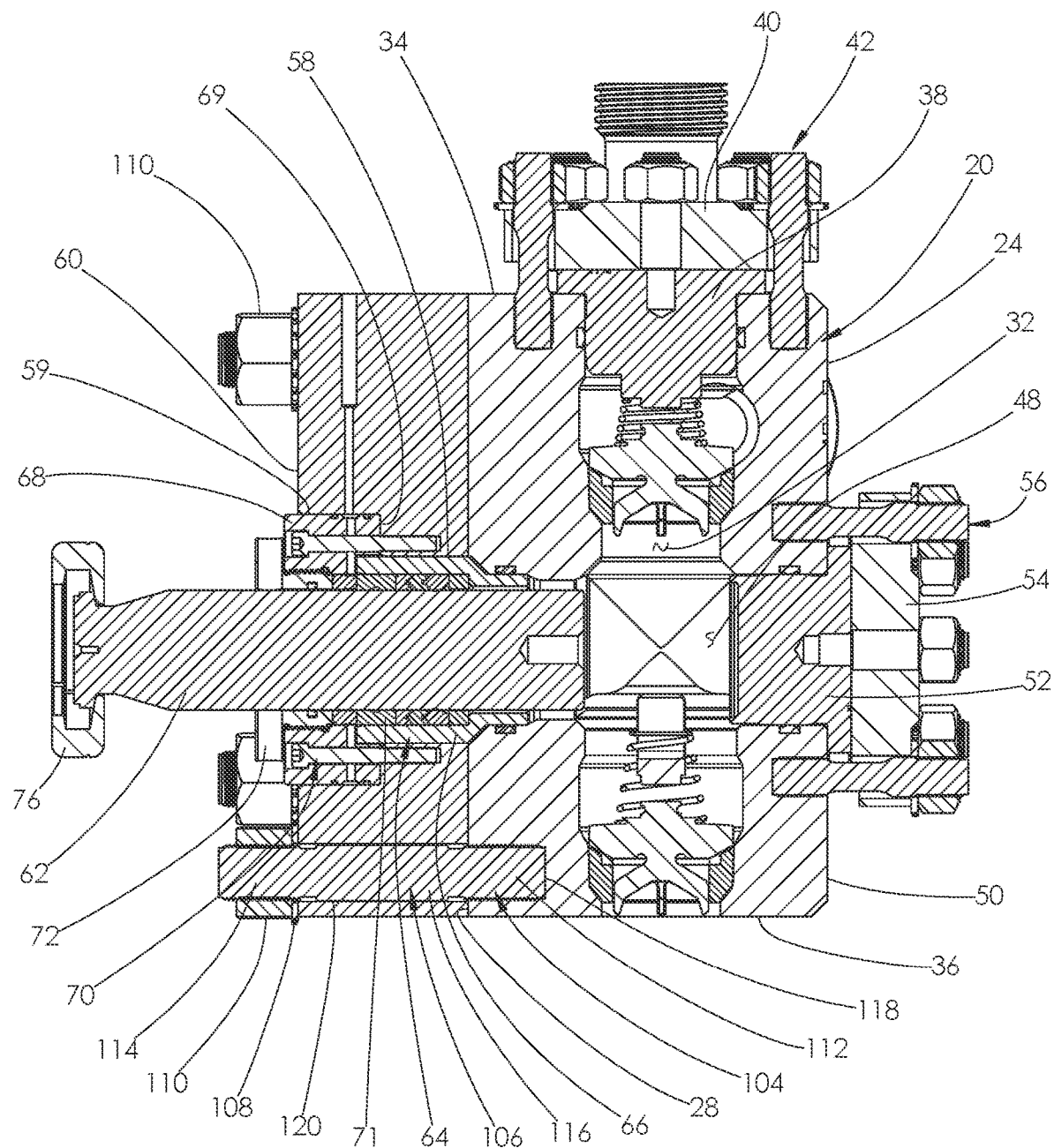
FIG. 3 is a cross-sectional view of the fluid end shown in FIG. 1, taken along line A-A. The inlet manifold has been removed for clarity.
Figure 4:
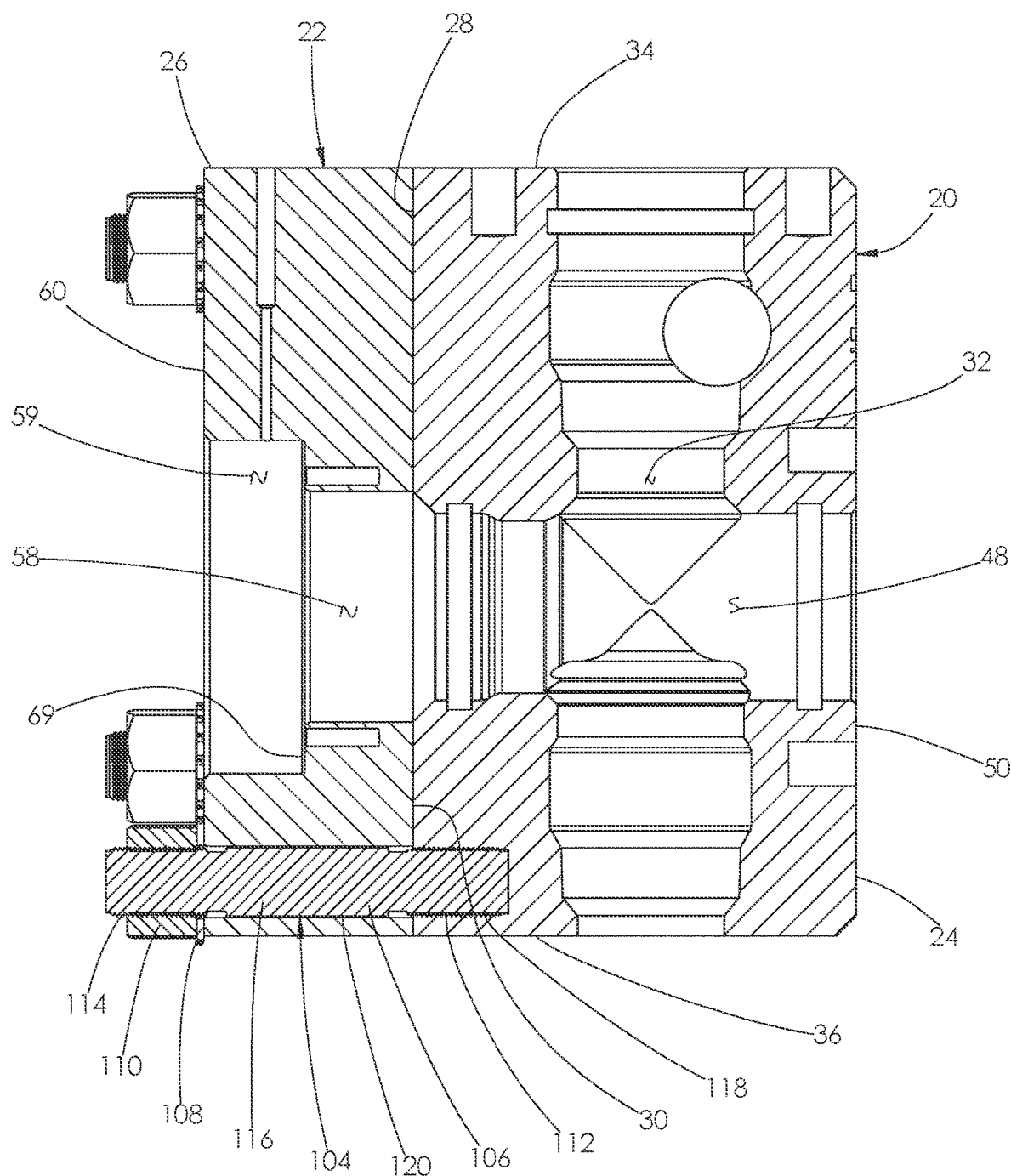
FIG. 4 is a cross-sectional view of the fluid end shown in FIG. 3. The inner and outer components of the fluid end have been removed for clarity.

With reference to FIG. 4, a plurality of rectilinear first bores 32, one of which is shown in FIG. 4, are formed in the first body 20. The plural first bores 32 are arranged in side-by-side relationship. Each of the first bores 32 extends through the entirety of the first body 20, interconnecting the top and bottom ends 34 and 36. At each of its opposed ends 34 and 36, the first bore 32 opens at the external surface 24. The diameter of each first bore 32 may vary throughout its length. Adjacent the top end 34 of the first body 20, each first bore 32 is closed by an installed component 38, as shown in FIG. 3. Each component 38 is releasably held within its first bore 32 by a retainer element 40 and fastening system 42, as shown in FIGS. 1-3, 5 and 6.

The components 38, retainer elements 40, and fastening system 42 shown in FIG. 3 may comprise those described in U.S. patent application Ser. No. 16/035,126, authored by Foster, et al. (the '126 Application), the entire contents of which are incorporated herein by reference. Likewise, the inner components of the fluid end 10, shown in FIG. 3, may comprise those inner components described in the '126 Application.

At the bottom end 36 of the first body 20, each of the first bores 32 is joined by a conduit 44 to an inlet manifold 46, as shown in FIGS. 1-2. Fluid enters the fluid end 10 through the conduits 44 of the inlet manifold 46.

Continuing with FIG. 4, a plurality of rectilinear second bores 48, one of which is shown in FIG. 4, are formed in the first body 20. The plural second bores 48 are arranged in side-by-side relationship. Each of the second bores 48 extends through the entirety of the first body 20, interconnecting the front and back sides 50 and 28. At each of its opposed sides 50 and 28, each second bore 48 opens at the external surface 24. Each of the second bores 48 intersects a corresponding one of the first bores 32. Each second bore 48 may be disposed in orthogonal relationship to its intersecting first bore 32.

Adjacent the front side 50 of the first body 20, each second bore 48 is closed by an installed component 52, as shown in FIG. 3, which may be identical to the component 38. Each component 52 is releasably held within its second bore 48 by a retainer element 54 and fastening system 56, as shown in FIGS. 1-3 and 5. The retainer element 54 may be identical to the retainer element 40, and the fastening system 56 may be identical to the fastening system 42.

Figure 6:
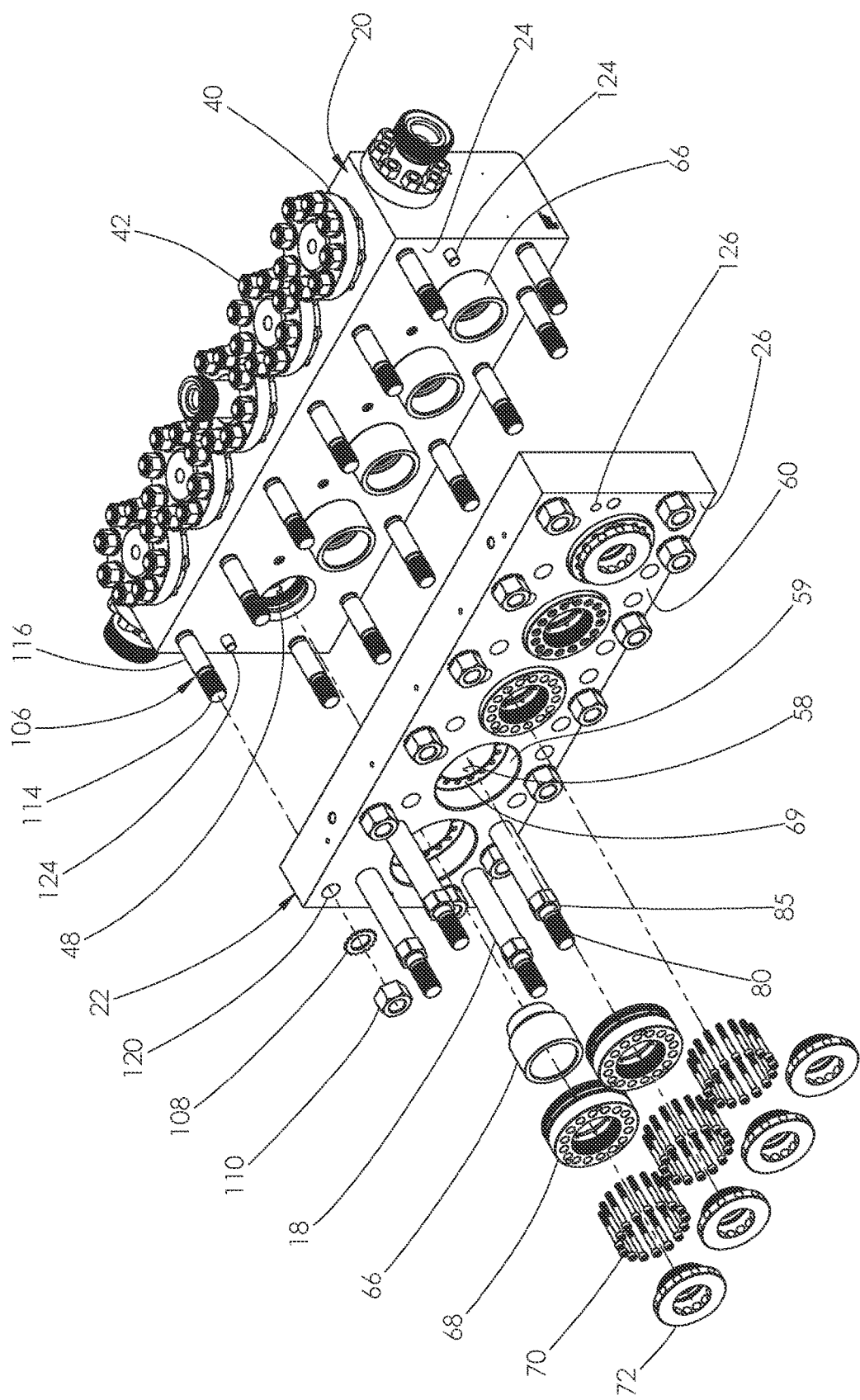
FIG. 6 is a partially exploded perspective view of a back side of the fluid end. A plurality of stay rods used to attach the fluid end to the power end are shown installed within a second body of the fluid end.
Figure 8:
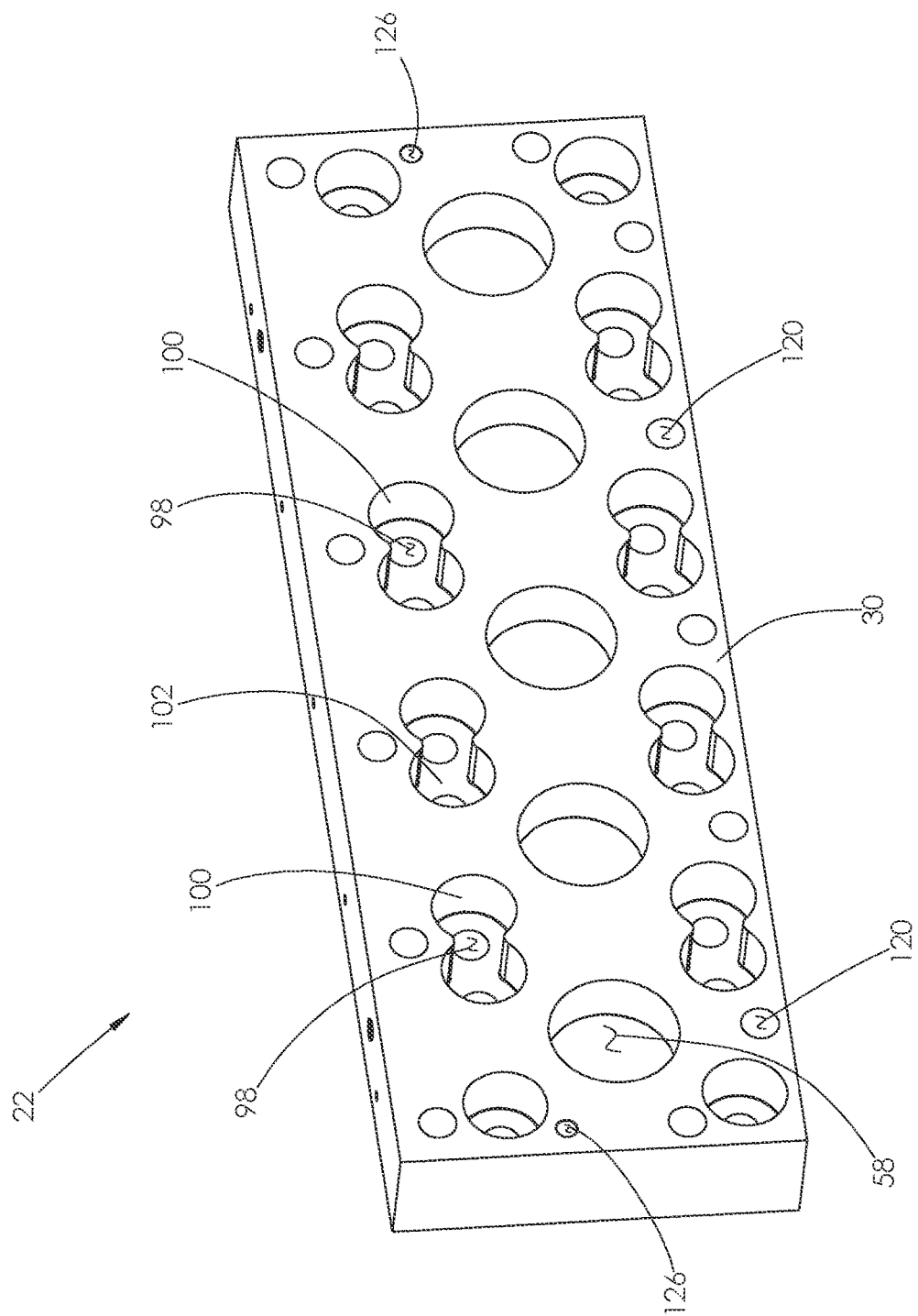
FIG. 8 is a perspective view of a front side of the second body of the fluid end shown in FIG. 6. The components installed within the second body have been removed for clarity.

With reference to FIGS. 4, 6 and 8, a plurality of rectilinear bores 58, one of which is shown in FIG. 4, are formed in the second body 22. The bores 58 are arranged in side-by-side relationship. Each of the bores 58 extends through the entirety of the second body 22, interconnecting the front and back sides 30 and 60. At each of its opposed sides 30 and 60, each bore 58 opens at the external surface 26. Each bore 58 includes a counterbore 59 formed adjacent the back side 60 of the second body 22, as shown in FIGS. 4 and 6. Each bore 58 formed in the second body 22 registers with a corresponding one of the second bores 48 formed in the first body 20. When the bodies 20 and 22 are joined and aligned, each bore 58 becomes an extension of its associated second bore 48, as shown in FIG. 4.

With reference to FIG. 3, a plunger 62 is installed within each pair of aligned bores 48 and 58. A sealing arrangement 64 is installed within each pair of aligned bores 48 and 58, and surrounds the plunger 62 within those bores. Each sealing arrangement 64 comprises a stuffing box sleeve 66 that houses a series of annular packing seals 71. The stuffing box sleeves 66 and packing seals 71 may be selected from those described in the '126 Application.

A retainer element 68 is installed within each bore 58, and holds the stuffing box sleeve 66 within such bore. Each retainer element 68 is secured to a flat bottom 69 of the counterbore 59 of its associated bore 58. A fastening system 70 holds the retainer element 68 in place. The seals 71 are compressed by a packing nut 72 threaded into an associated retainer element 68. The retainer elements 68, fastening system 70, plungers 62, and packing nuts 72 may be selected from those described in the '126 Application.

Turning back to FIGS. 1-2, the power end 12 comprises a plurality of pony rods 74. Pony rods are known in the art as elongate rods that interconnect the crankshaft of a power end to each of the plungers positioned within a fluid end. Each pony rod 74 extends through a corresponding opening formed in the mounting plate 16. Each pony rod 74 is attached to a corresponding one of the plungers 62 by means of a clamp 76. An engine attached to the power end 12 drives reciprocating movement of the pony rods 74. Such movement of the pony rods 74 causes each plunger 62 to reciprocate within its associated pair of aligned bores 48 and 58. High pressure fluid pumped through the fluid end 10 by the plungers 62 exits the fluid end 10 through one or more outlet conduits 78.

Figure 7:
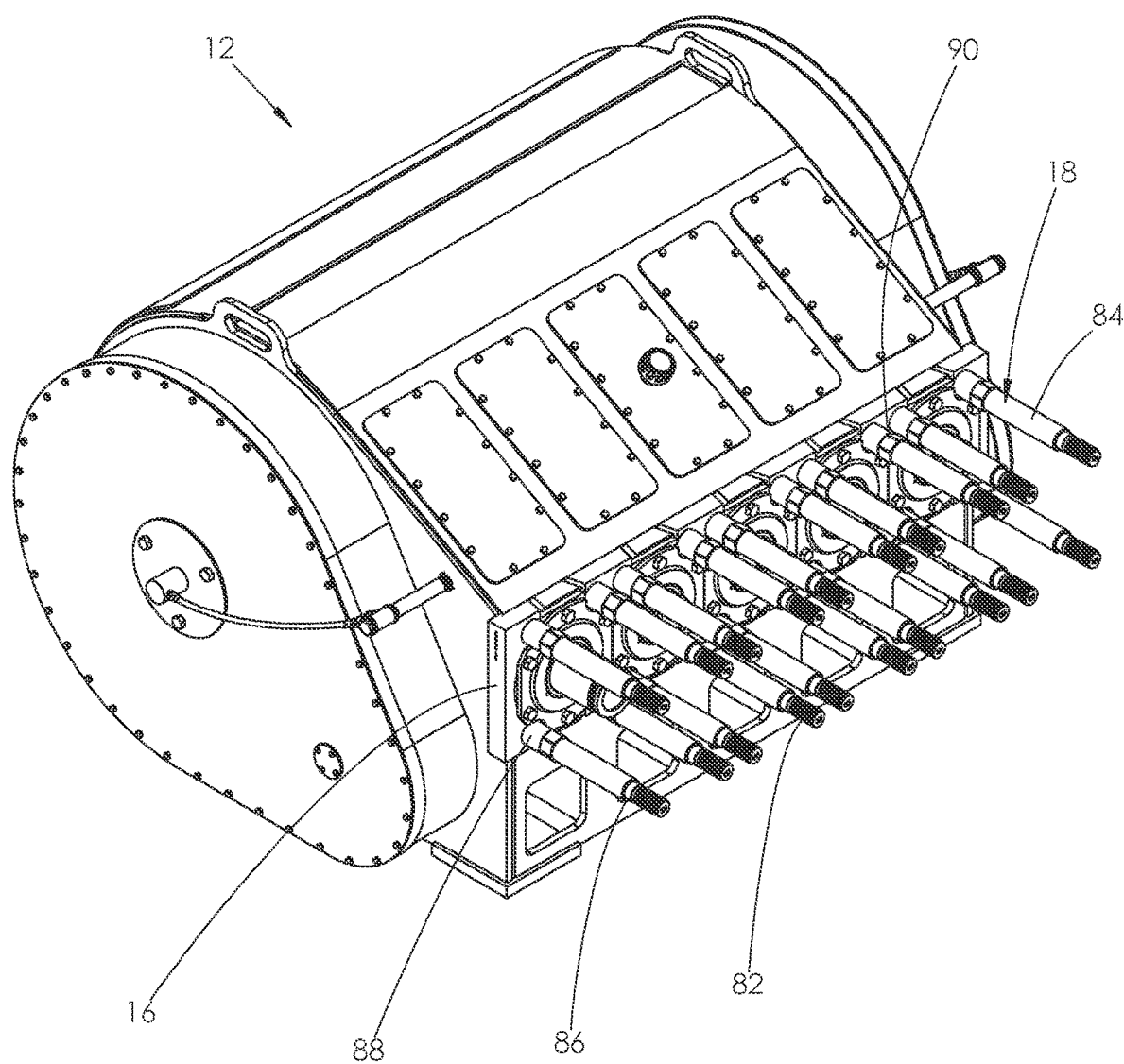
FIG. 7 is a perspective view of the power end shown in FIG. 1 with the stay rods attached thereto. The fluid end has been removed for clarity.

With reference to FIGS. 6 and 7, each stay rod 18 comprises a cylindrical body 84 having opposed first and second ends 80 and 82. External threads are formed in the body 84 adjacent each of its ends 80 and 82. These threaded portions of the body 84 are of lesser diameter than the rest of the body 84. A step separates each threaded portion of the body from its unthreaded portion. Step 85 is situated adjacent the first end 80, and step 86 is situated adjacent the second end 82.

Continuing with FIG. 7, a plurality of internally threaded connectors 88 are supported on the front surface of the mounting plate 16. Each connector 88 mates with the threaded first end 80 of a corresponding stay rod 18. An integral nut 90 is formed on each stay rod 18 adjacent its first end 80. The nut 90 provides a gripping surface where torque may be applied to the stay rod 18 during installation. Once a stay rod 18 has been installed in a connector 88, its second end 82 projects from the front surface of the mounting plate 16. In alternative embodiments, the stay rods 18 may thread directly into holes formed in the mounting plate.

Figure 9:
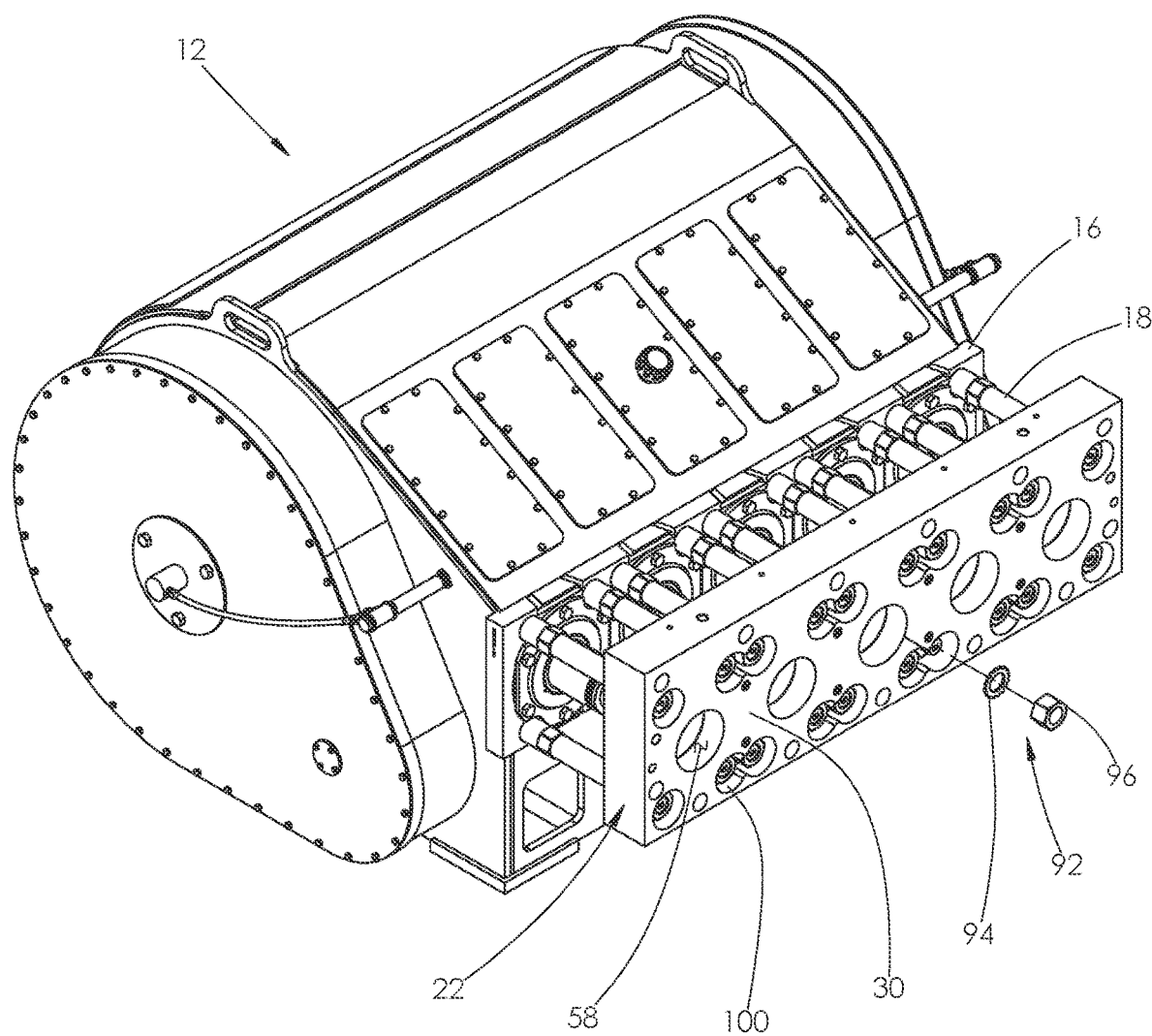
FIG. 9 is a perspective view of the power end of FIG. 7 with the second body of FIG. 8 attached thereto. The first body of the fluid end has been removed for clarity. A portion of the fastening system used to secure the second body to the power end is shown exploded for reference.
Figure 10:
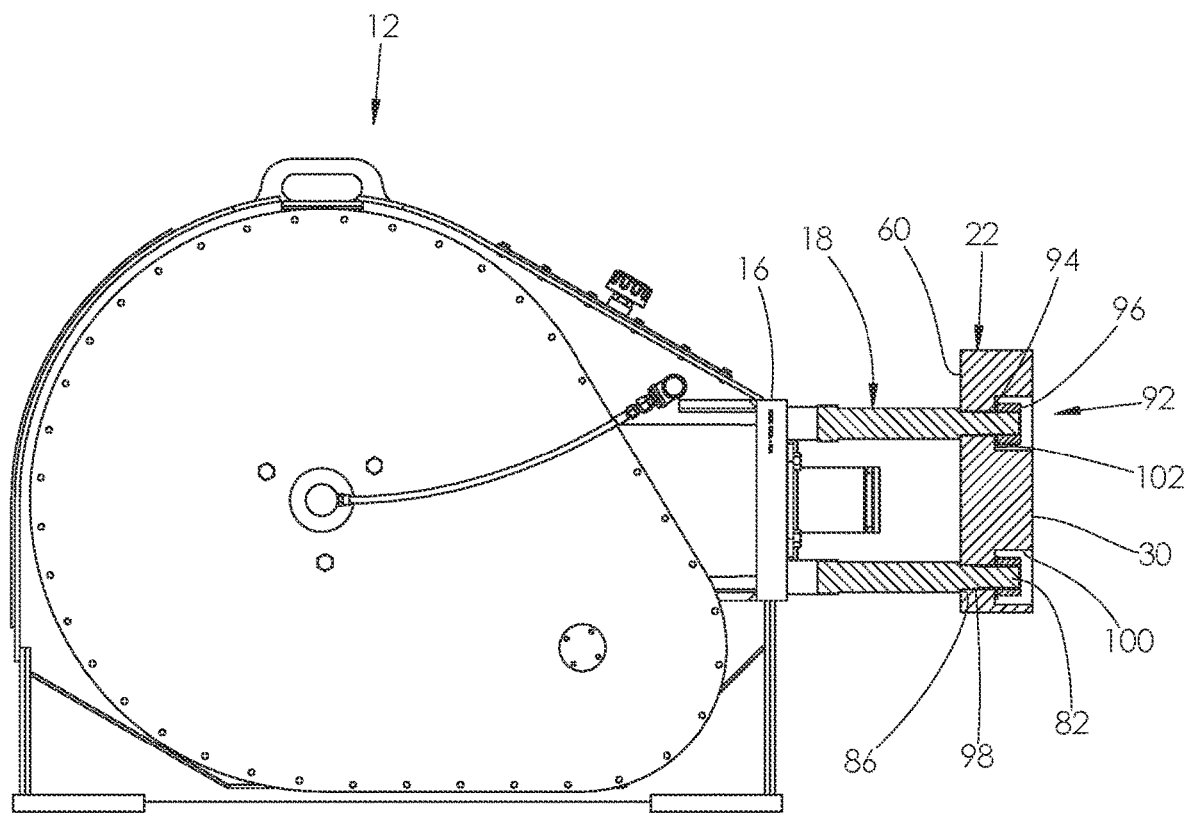
FIG. 10 is a side elevation view of the power end and attached second body shown in FIG. 9. The second body and stay rods attaching the second body to the power end are shown in cross-section.

With reference to FIGS. 8-10, the second body 22 is secured to the stay rods 18 using a fastening system 92. The fastening system 92 includes a plurality of washers 94 and a plurality of internally threaded nuts 96. A plurality of bores 98 are formed about the periphery of the second body 22. The number of bores 98 may equal the number of stay rods 18. A single stay rod 18 is installed within each of the bores 98, at its second end 82, as shown in FIG. 10. Each bore 98 includes a counterbore 100 formed adjacent the front side 30 of the second body 22, as shown in FIGS. 8 and 10. Adjacent counterbores 100 may overlap each other, as shown in FIGS. 8 and 9. In alternative embodiments, each bore may be spaced from each adjacent bore such that their respective counterbores do not overlap.

A stay rod 18 is installed by inserting its second end 82 into the opening of the bore 98 formed in the back side 60 of the second body 22. The stay rod 82 is extended into the bore 98 until the step 86 abuts the back side 60, as shown in FIG. 10.

When a stay rod 18 is installed, its second end 82 projects within the counterbore 100 of its associated bore 98. To secure each stay rod 18 to the second body 22, a washer 94 and nut 96 are installed on the second end 82 of the stay rod 18, as shown in FIGS. 9 and 10. Each nut 96 and its underlying washer 94 press against a flat bottom 102 of the counterbore 100 within which they are installed. Each nut 96 is fully submerged within its recessed counterbore 100.

Figure 5:
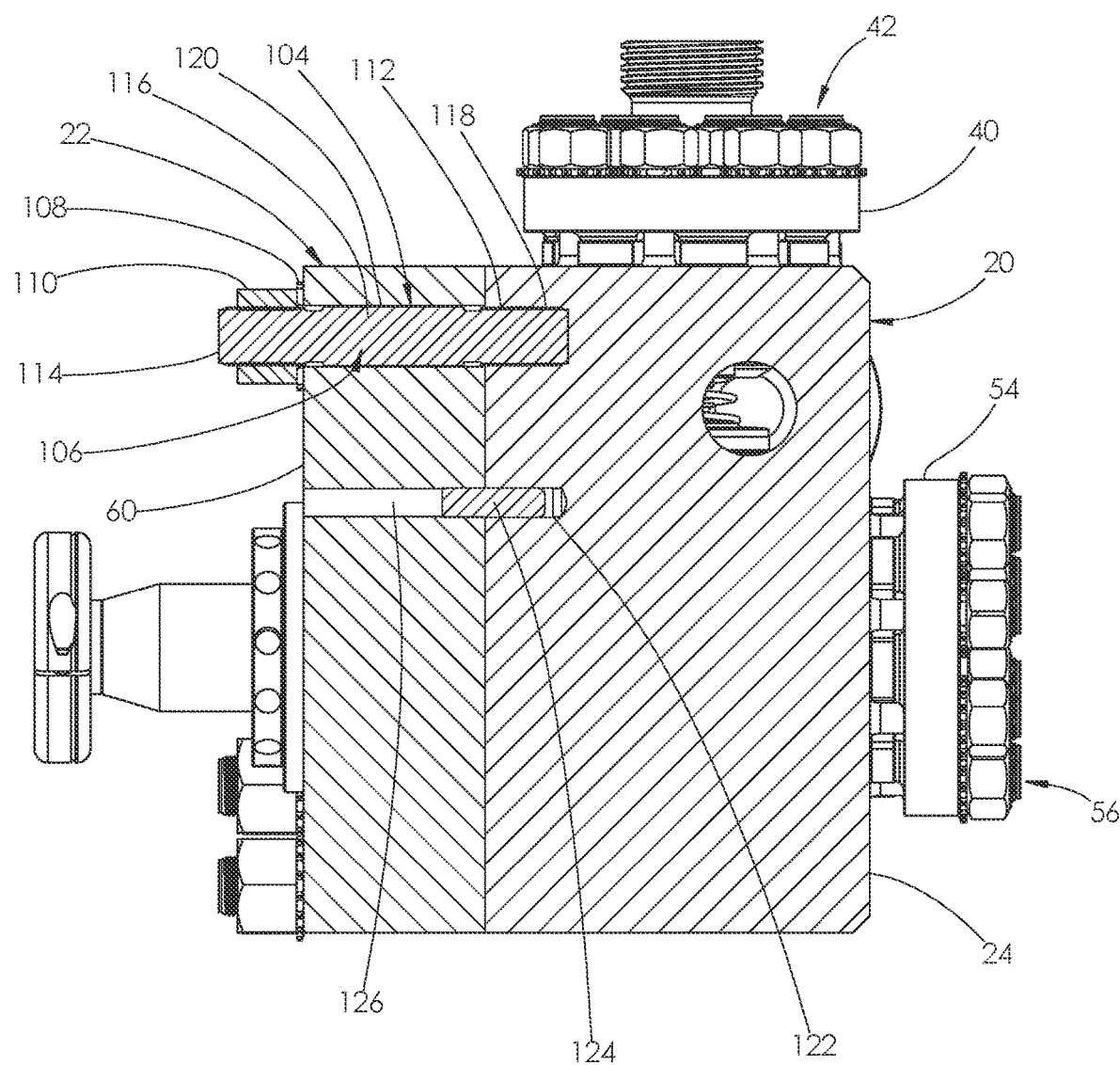
FIG. 5 is a cross-sectional view of the fluid end shown in FIG. 1, taken along line B-B. The inlet manifold has been removed for clarity.

With reference to FIGS. 3-6, the first body 20 is secured to the second body 22 using a fastening system 104. The fastening system 104 comprises a plurality of studs 106, a plurality of washers 108, and plurality of internally threaded nuts 110. Each stud 106 comprises a cylindrical body 116 having a pair of opposed ends 112 and 114, as shown in FIGS. 3-5. Each of the ends 112 and 114 is externally threaded.

A plurality of internally threaded openings 118 are formed about the periphery of the first body 20, as shown in FIGS. 3-5. The first end 112 of each stud 106 mates with a corresponding one of the openings 118. Once a stud 106 has been installed in the first body 20, its second end 114 projects from the body's external surface 24, as shown in FIG. 6.

A plurality of through-bores 120 are formed about the periphery of the second body 22, as shown in FIGS. 3-5. The through-bores 120 are alignable with the plural studs 106 projecting from the first body 20.

To assemble the first and second bodies 20 and 22, the plural studs 106 are installed in the plural openings 118 of the first body 20. The first body 20 and installed studs 106 are positioned such that each through-bore 120 formed in the second body 22 is aligned with a corresponding stud 106. The first and second bodies 20 and 22 are then brought together such that each stud 106 is received within a corresponding through-bore 120. When the bodies 20 and 22 are thus joined, the second end 114 of each stud 106 projects from the back side 60 of the second body 22. Finally, a washer 108 and nut 110 are installed on the second end 114 of each stud 106, as shown in FIGS. 2-5, thereby securing the bodies together.

Continuing with FIG. 5, one or more pin bores 122 may be formed in the first body 20 adjacent its outer edges. Each pin bore 122 may receive a pin 124 that projects from the external surface 24 of the first body 20, as shown in FIGS. 5 and 6. These pins 124 may be installed within a corresponding bore 126 formed in the second body 22, as shown in FIGS. 5 and 6. The pins 124 help align the first and second bodies 20 and 22 during assembly of the fluid end 10.

The concept of a "kit" is described herein due to the fact that fluid ends are often shipped or provided unassembled by a manufacturer, with the expectation that an end customer will use components of the kit to assemble a functional fluid end. Accordingly, certain embodiments within the present disclosure are described as "kits," which are unassembled collections of components. The present disclosure also describes and claims assembled apparatuses and systems by way of reference to specified kits, along with a description of how the various kit components are actually coupled to one another to form the apparatus or system.

Several kits are useful for assembling the fluid end 10. A first kit comprises the first body 20 and the second body 22. The first kit may also comprise the fastening system 92 and/or the fastening system 104. The first kit may further comprise the components 38 or 52, sealing arrangements 64, retainer elements 40, 54 or 68, fastening systems 42, 56 or 70, packing nuts 72, plungers 62, and/or clamps 72, described herein.

With reference to FIGS. 6-8, the positioning of the bores 98 around the periphery of the second body 22 corresponds with the positioning of the stay rods 18 on the mounting plate 16. Thus, each second body 22 is constructed specifically to match different stay rod 18 spacing configurations known in the art.

As shown in FIGS. 2-6, the second body 22 has a lesser thickness than the first body 20 (thickness being measured in FIG. 2 along the line A-A, for example). However, the bodies 20 and 22 have the same depth and height, so that they form a rectangular prism when assembled. Thus, the front side of the second fluid end body and the back side of the first fluid body may have the same dimensions in some embodiments. In other embodiments, the dimensions of these opposing sides may be different. Also, it is noted that the corner edges of such prism may be beveled.

The first and second bodies 20, 22 may be formed from a strong durable material, such as steel. Because the first body 20 must receive fluids under conditions of high pressure, it may be formed from stainless steel or cast iron. In contrast, the second body 22 does not receive high pressure fluids: it serves only as a connection between the power end 12 and the first body 20. The second body 22 can thus be formed from a different, lower strength, and less costly material than the first body 20. For example, when the first body 20 is formed from stainless steel, the second body can be formed from a less costly alloy steel. Alternatively, the first and second bodies may be formed from the same material, such as stainless steel.

In order to manufacture the fluid end 10, the first and second bodies 20 and 22 are each cut to size from blocks of steel. Multiple first or second bodies 20 or 22 may be forged from the same block. In such case, the bodies 20 and 22 may be forged by dividing the block parallel to its length into multiple rectangular pieces. Because a flange is not forged from the block, material that is typically discarded may instead be used to form one of the first or second bodies 20 or 22. If the bodies 20 and 22 are formed from the same material, the first and second body 20 and 22 may be forged from the same block.

After the bodies 20 and 22 are formed, the bores and openings described herein are machined into each body 20 and 22. The studs 106, as well as the internal components shown in FIG. 3, including the components 38, retainer elements 40 and fastening system 42, are next installed in the first body 20. After the necessary bores have been formed in the second body 22, the sealing arrangements 64, retainer elements 68, fastening system 70, plungers 62 and packing nuts 72 described herein are installed. Prior to operation, the second body 22 is attached to the power end 12, and the first body 20 is attached to the second body 22.

During operation, the pumping of high pressure fluid through the fluid end 10 causes it to pulsate or flex. Such motion applies torque to the fluid end 10. The amount of torque applied to the fluid end 10 corresponds to the distance between the power end 12 and the front side 50 of the fluid end: the moment arm.

In flanged fluid ends, such as the fluid end 300 shown in FIGS. 14 and 15, the applied torque is known to cause fatigue failures at the flanged connection point. A flanged connection point 310 is shown in FIGS. 14 and 15. Flanged fluid ends require space between the flange and the fluid end body to operate a wrench, as shown by a space 312 in FIGS. 14 and 15. Such space is not needed with the fluid end 10. Thus, the moment arm associated with the fluid end 10 is decreased from that associated with flanged fluid ends. Therefore, less torque is applied to the fluid end 10 during operation than flanged fluid ends, which makes the fluid end 10 less susceptible to fatigue failures.

Figure 11:
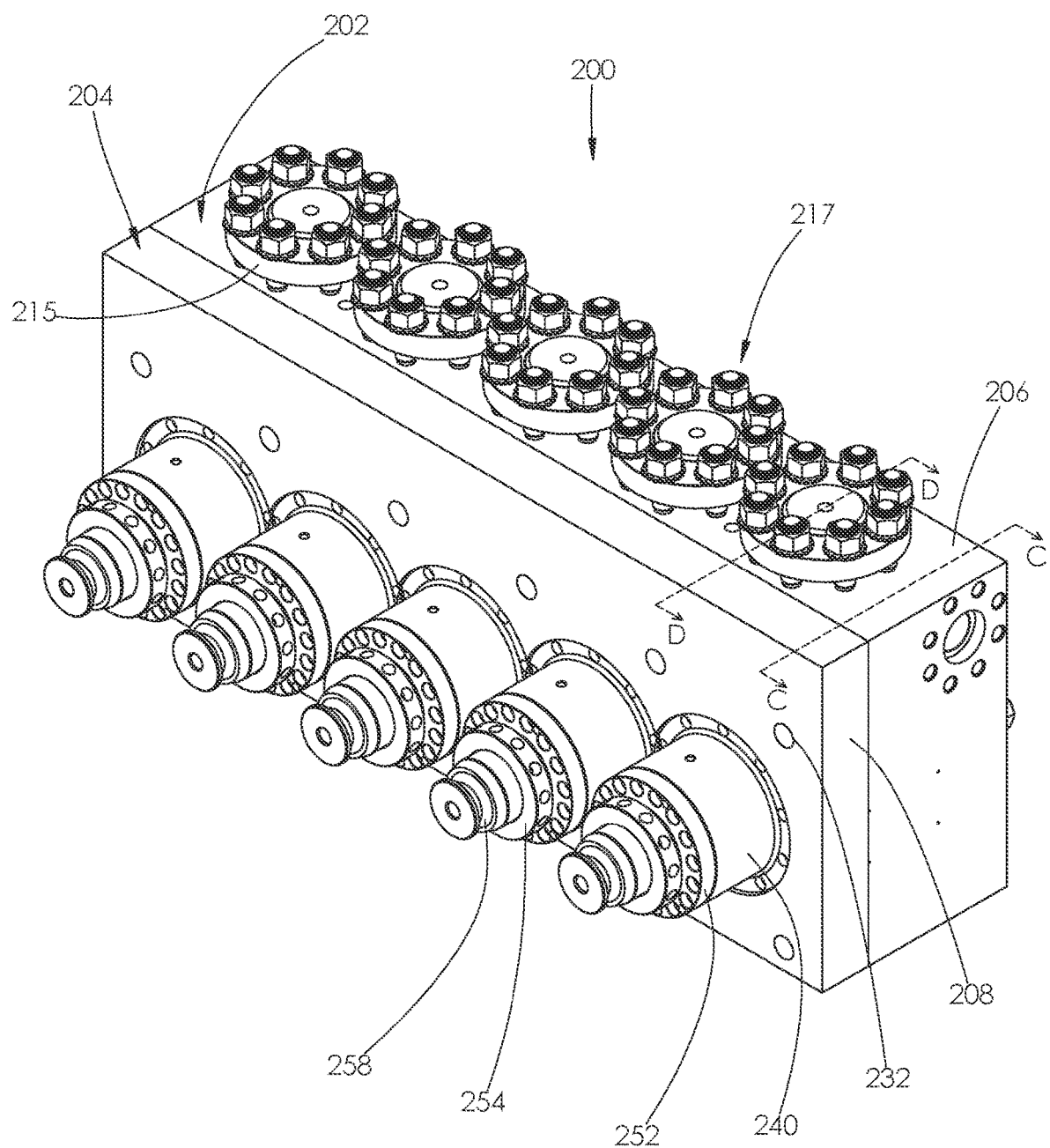
FIG. 11 is a perspective view of a back side of an alternative embodiment of a fluid end.
Figure 12:
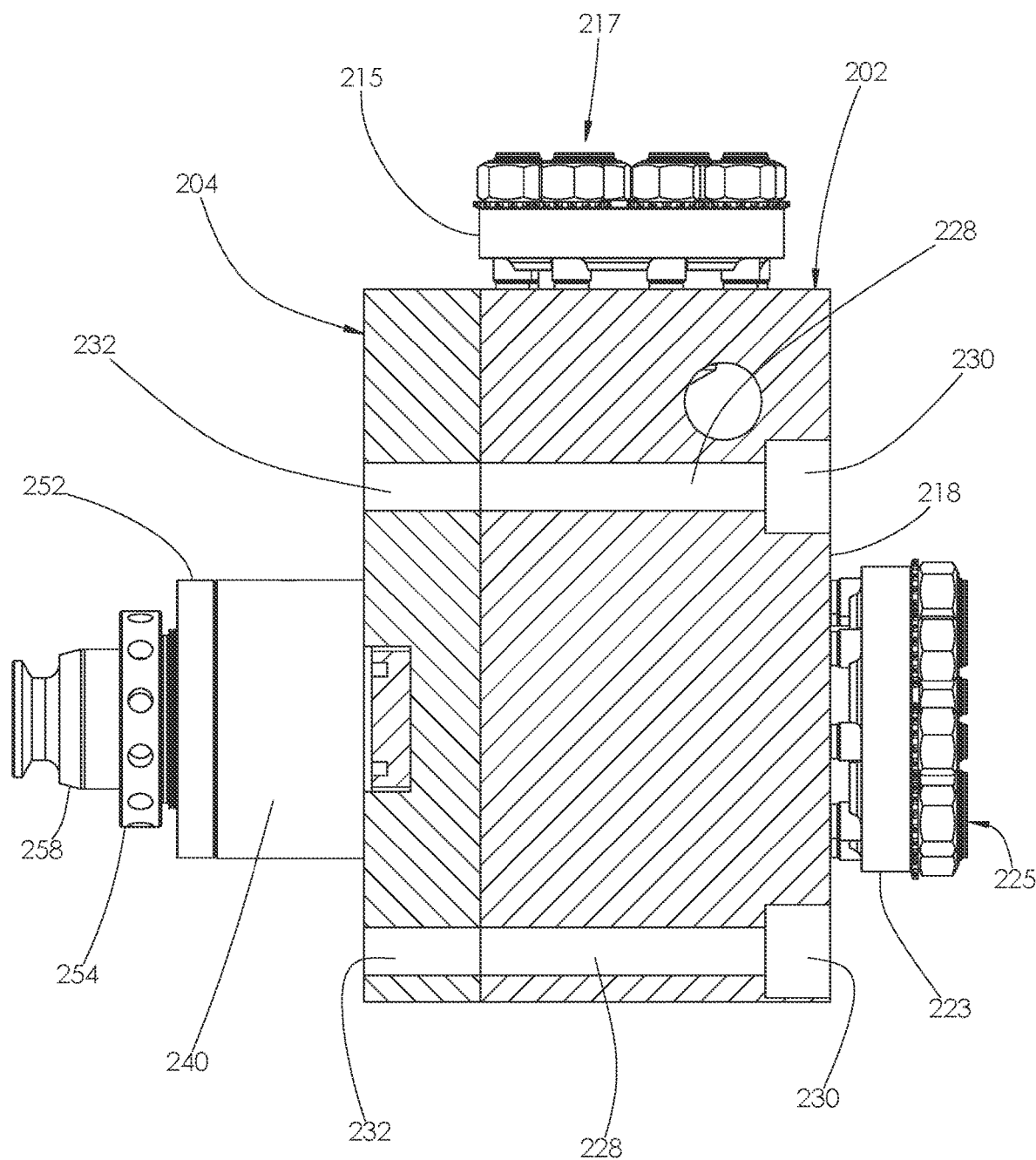
FIG. 12 is a cross-sectional view of the fluid end shown in FIG. 11, taken along line C-C.
Figure 13:
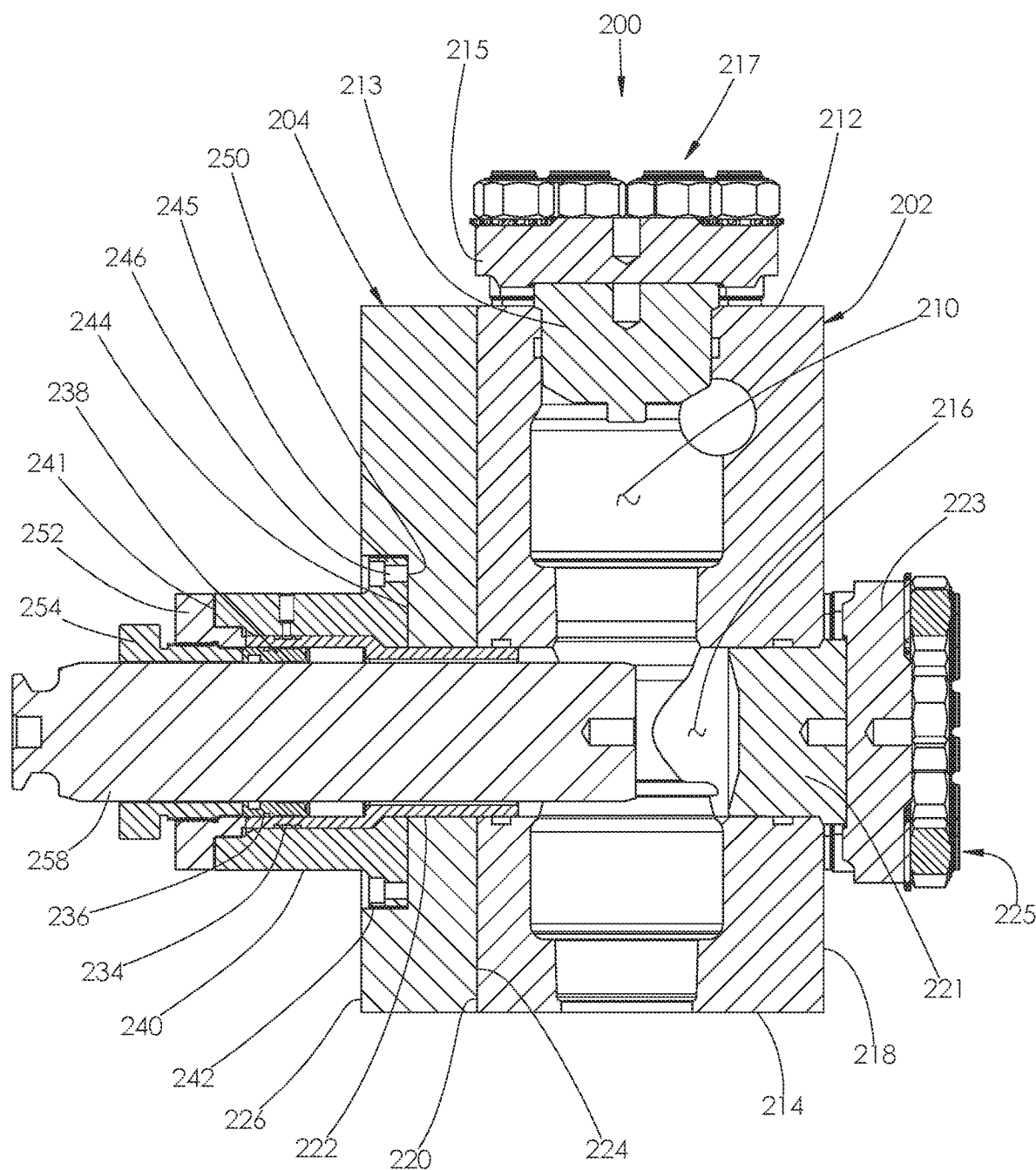
FIG. 13 is a cross-sectional view of the fluid end shown in FIG. 11, taken along line D-D.

Turning to FIGS. 11-13, an alternative embodiment of a fluid end 200 is shown. The fluid end 200 comprises a first body 202 attached to separate second body 204. The second body 204 is machined to have a lesser thickness than that of the second body 22, shown in FIGS. 1-2. As described later herein, providing the second body 204 with a lesser thickness allows the first and second bodies 202 and 204 to be attached together using a single fastening system.

Continuing with FIGS. 11-13, the first and second bodies 202 and 204 each have a plurality of flat external surfaces 206 and 208. The surfaces 206 and 208 may be rectangular in shape. The exterior surfaces 206 and 208 of each body 202 and 204 may be joined in the shape of a rectangular prism. However, the corner edges of such prism may be beveled.

With reference to FIG. 13, a plurality of rectilinear first bores 210, one of which is shown in FIG. 13, are formed in the first body 202. The plural bores 210 are arranged in side-by-side relationship. Each first bore 210 extends through the entirety of the first body 202, interconnecting its top and bottom ends 212 and 214. At each of its opposed ends 212 and 214, the first bore 210 opens at the external surface 206.

Adjacent the top end 212 of the first body 202, each first bore 210 is closed by an installed component 213. Each component 213 is releasably held within its first bore 210 by a retainer element 215 and fastening system 217, as shown in FIGS. 11-13. The components 213, retainer elements 215, and fastening system 217 may be selected from those described in the '126 Application.

Continuing with FIG. 13, a plurality of rectilinear second bores 216, one of which is shown in FIG. 13, are formed in the first body 202. The plural second bores 216 are arranged in side-by-side relationship. Each second bore 216 extends through the entirety of the first body 202, interconnecting its front and back sides 218 and 220. At each of its opposed sides 218 and 220, each second bore 216 opens at the external surface 206. The second bores 216 each intersect a corresponding one of the first bores 210. Each second bore 216 may be disposed in orthogonal relationship to its intersecting first bore 210.

Adjacent the front side 218, each second bore 216 is closed by an installed component 221, which may be identical to the component 213. Each component 221 is releasably held within its second bore 216 by a retainer element 223 and fastening system 225, as shown in FIGS. 12 and 13. The retainer element 223 may be identical to the retainer element 215, and the fastening system 225 may be identical to the fastening system 217.

Continuing with FIG. 13, a plurality of bores 222, one of which is shown in FIG. 13, are formed in the second body 204. The bores 222 are arranged in side-by-side relationship. Each bore 222 extends through the entirety of the second body 204, interconnecting its front and back sides 224 and 226. At each of its opposed sides 224 and 226, each bore 222 opens at the external surface 208. Each bore 222 formed in the second body 204 registers with a corresponding one of the second bores 216 formed in the first body 202. When the bodies 202 and 204 are joined and aligned, each bore 222 becomes an extension of its associated second bore 216.

With reference to FIG. 12, a plurality of bores 228 are formed in the outer periphery of the first body 202. Each bore 228 includes a counterbore 230 positioned immediately adjacent the front side 218 of the first body 202. The bores 228 are each alignable with a plurality of corresponding through-bores 232 formed about the periphery of the second body 204, as shown in FIGS. 11-12.

A fastening system is used to secure the first body 202 to the second body 204. The fastening system comprises a plurality of stay rods, similar to stay rods 18, and a plurality of nuts and washers. The stay rods are installed within each aligned bore 228 and 232. A nut and washer is torqued on the end of each stay rod within each corresponding counterbore 230. The bodies 202 and 204 are attached such that the back side 220 of the first body 202 is in flush engagement with the front side 224 of the second body 204.

Continuing with FIG. 12, in order for a stay rod to extend the length between the first and second bodies 202 and 204, the second body 204 is machined to have a lesser thickness than the second body 22, shown in FIGS. 1-6. Such decrease in size is possible because a plurality of sealing arrangements 234 used with the second body 204 are primarily positioned outside of the second body 204, as shown in FIG. 13. Each sealing arrangement 234 comprises a stuffing box sleeve 236 that houses a series of packing seals 238. The stuffing box sleeves 236 and packing seals 238 may be selected from those described in the '126 Application.

As shown in FIG. 13, each bore 222 formed in the second body 204 includes a counterbore 242 that opens on the back side 226 of the second body 204. A removable box gland 240 is closely received within each counterbore 242. The removable box glands 240 are each tubular sleeves having open first and second ends 241 and 244. Each second end 244 has a flanged outer edge 245 that is sized to be closely received within each counterbore 242. Each sealing arrangement 234 is housed at least partially within a corresponding removable box gland 240.

A plurality of openings 246 are formed in the flanged outer edge 245 of each box gland 240. The openings 246 correspond with a plurality of openings (not shown) formed in a flat bottom 250 of each counterbore 242. A plurality of fasteners may be installed within the opening 246 and the opening formed in the bottom 250. When installed, the fasteners releasably secure each box gland 240 to the second body 204.

Continuing with FIG. 11-13, a retainer element 252 and fastening system hold the sleeve 236 within the box gland 240 and aligned with bores 222 and 242, as shown in FIG. 13. The retainer element 252 and fastening system may be the same as the retainer element 68 and fastening system 70, as shown in FIG. 3. The seals 238 are compressed by a packing nut 254 threaded into an associated retainer element 252, as shown in FIG. 13. A plunger 258 is installed within each pair of aligned bores 216 and 222.

Several kits are useful for assembling the fluid end 200. A first kit comprises the first body 202 and the second body 204. The first kit may also comprise the fastening system described with reference to FIG. 13 to attach the bodies 202 and 204. The first kit may further comprise the components 213 or 221, removable box glands 240, sealing arrangements 234, retainer elements 215, 223 or 252, fastening system 217, 225 or the fastening system used with the box gland 240, packing nuts 254, and/or plungers 258, described herein.

The bodies 202 and 204 may be formed of the same material as the bodies 20 and 22. Likewise, the bodies 202 and 204 may be manufactured in the same manner as the bodies 20 and 22.

The plurality of washers used with each fastening system 92 and 104, shown in FIGS. 3-6, 9 and 10, may be configured to allow a large amount of torque to be applied to the nuts without using a reaction arm. Instead, the washer itself may serve as the counterforce needed to torque a nut onto a stud. Not having to use a reaction arm increases the safety of the assembly process. The same is true for the washers that may be used with the fastening system described with reference to FIG. 12.

The nuts used with the fastening systems 92 and 104 may also comprise a hardened inner layer to help reduce galling between the threads of the nuts and studs during the assembly process. The same is true for the nuts that may be used with the fastening system described with reference to FIG. 12. An example of the above described washers, nuts, and methods are described in Patent Cooperation Treaty Application Serial No. PCT/US2017/020548, authored by Junkers, et al.

Changes may be made in the construction, operation and arrangement of the various parts, elements, steps and procedures described herein. For example, certain embodiments of the second fluid end body piece (or pieces) are described above as "flangeless." In other embodiments, a minimally flanged fluid end body piece may also be utilized. Consider the surface dimension of the wider portion of the flanged piece to the narrower portion of the piece—for example, the height of the portion of flange 302 in FIG. 14 to the height of the narrower portion that engages with the first body piece. In one set of embodiments, the ratio r of the height (or other corresponding surface dimension) of the narrower portion to the height (or other corresponding surface dimension) of the wider portion may be 0.90<r<1.0; in other embodiments the ratio r may be 0.95<r<1.0.

The fluid ends 10 and 200 described herein may be used in conjunction with components and methods described in co-pending patent applications by the applicant. These components may be used in various combinations and arrangements. Accordingly, U.S. patent application Ser. No. 15/719,124, authored by Nowell, et al., U.S. patent application Ser. No. 16/043,579, authored by Foster, et al., U.S. patent application Ser. No. 16/169,663, authored by Foster, et al., U.S. patent application Ser. No. 16/111,754, authored by Nowell, et al., U.S. Provisional Patent Application Ser. No. 62/636,425, authored by Nowell, et al., U.S. Provisional Patent Application Ser. No. 62/676,656, authored by Nowell, et al., U.S. Provisional Patent Application Ser. No. 62/653,605, authored by Nowell, et al., and U.S. Provisional Patent Application Ser. No. 62/700,079, authored by Nowell, et al., are each incorporated herein by reference in their entireties.

The invention claimed is:

1. An apparatus, comprising:
  a fluid end, the fluid end comprising:
    a housing having an external surface;
    a discharge port formed in the external surface;
    a suction port formed in the external surface;
    a rectilinear fluid bore path formed within the housing and interconnecting the discharge and suction ports;
    a discharge valve interposed in the fluid bore path adjacent the discharge port;
    a suction valve interposed in the fluid bore path adjacent the suction port; and
    a stuffing box configured to house a plurality of packing seals;
    in which the housing is broken into separate parts at an interface, the parts comprising:
      a first part, the first part containing both the discharge valve and the suction valve; and
      a second part, comprising:
        a plurality of passages extending entirely through the second part, each passage configured to receive a stud configured to connect the second part to the first part;
        in which the second part contains neither the discharge valve nor the suction valve;
      in which at least a portion of the stuffing box is positioned within the first part; and in which at least a portion of the stuffing box is positioned within the second part.

2. The apparatus of claim 1, in which the interface is planar.

3. The apparatus of claim 1, in which the fluid end further comprises:
a rectilinear plunger bore formed within the housing, the rectilinear plunger bore extending within both the first and second parts; in which the rectilinear plunger bore intersects the fluid bore path.

4. The apparatus of claim 3, in which the rectilinear plunger bore joins a first port and a second port formed in the external surface of the housing; in which the first port is located within the first part and the second port is located within the second part.

5. The apparatus of claim 1, in which both the discharge port and the suction port are situated within the first part.

6. The apparatus of claim 1, in which the first and second parts are formed from different materials.

7. The apparatus of claim 1, further comprising a power end mechanically connected to the fluid end such that the power end is separated from the first part of the housing by the second part of the housing.

8. The apparatus of claim 7, in which the second part of the housing does not include a flange configured for connection to the power end.

9. An apparatus, comprising:
a second body configured to be assembled with a separate first body to form a fluid end, the second body comprising:
an external surface having a front side and an opposed back side, in which the front side is connected to the first body and the back side faces a power end;
at least one plunger bore extending entirely through the second body, the at least one plunger bore terminating at openings formed on the front and back sides of the external surface;
a plurality of passages extending entirely through the second body, each passage configured to receive a stay rod configured to attach the second body to the power end; and
a plurality of second passages extending entirely through the second body, each second passage configured to receive a stud configured to connect the second body to the first body;
a packing assembly;
a retainer attached to the back side of the second body via a plurality of threaded fasteners; and
a stuffing box configured to receive the packing assembly, in which at least a portion of the stuffing box is secured within the second body via the retainer;
in which the second body does not house a discharge valve or a suction valve.

10. The apparatus of claim 9, in which the first and second bodies are made of different materials.

11. A kit, comprising:
a fluid end, the fluid end comprising:
a first body, comprising:
a plurality of orthogonal bore pairs, each bore pair comprising:
a first bore containing an intake valve and a discharge valve; and
a second bore containing at least a portion of a plunger; and
the apparatus of claim 9.

12. A fluid end assemblable from separate first and second bodies, the fluid end comprising:
a first body, the first body comprising:
an external surface having a front side, a back side, a top side, and a bottom side; in which the front side is opposed to the back side; and in which the top side is opposed to the bottom side; and
at least one bore pair, the at least one bore pair comprising:
a first bore extending entirely through the first body and terminating at openings formed in the top and bottom sides of the external surface;
a second bore extending entirely through the first body, intersecting the first bore and terminating at openings formed in the front and back sides of the external surface; and
a valve pair positioned within the first bore, the valve pair comprising an intake valve and a discharge valve;
a second body, the second body comprising:
an external surface having a front side configured to engage the back side of the first body's external surface and an opposed back side;
at least one plunger bore, the at least one plunger bore extending entirely through the second body and terminating at openings formed in the front and back sides of the second body's external surface; in which the at least one plunger bore is configured to align with the second bore formed in the first body;
a plurality of passages extending entirely through the second body, each passage configured to receive a stay rod configured to attach the second body to a power end; and
a plurality of second passages extending entirely through the second body, each second passage configured to receive a stud configured to connect the second body to the first body;
in which the second body does not house the valve pair; and
a retainer secured to the back side of the second body's external surface.

13. The fluid end of claim 12, in which the first body is made of a different material than the second body.

14. The fluid end of claim 12, in which no flange is formed on either the first or second bodies.

15. The fluid end of claim 12, in which the external surface of the first body comprises a first planar interface surface; in which the external surface of the second body comprises a second planar interface surface; in which the first and second interface surfaces are identical in size and shape and are registrable with one another.

16. An apparatus, comprising:
the fluid end of claim 12; and
a power end mechanically connected to the fluid end;
in which the power end is separated from the first body by the second body.

17. The fluid end of claim 12, further comprising a reciprocating plunger, the reciprocating plunger configured to be received within both the first and second bodies.

* * * * *